(12) United States Patent
Zhu et al.

(10) Patent No.: US 11,966,594 B2
(45) Date of Patent: Apr. 23, 2024

(54) POWER MANAGEMENT FOR A MEMORY SYSTEM

(71) Applicant: YANGTZE MEMORY TECHNOLOGIES CO., LTD., Wuhan (CN)

(72) Inventors: Feifei Zhu, Wuhan (CN); Youxin He, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 198 days.

(21) Appl. No.: 17/384,073

(22) Filed: Jul. 23, 2021

(65) Prior Publication Data
US 2022/0382466 A1 Dec. 1, 2022

Related U.S. Application Data

(63) Continuation of application No. PCT/CN2021/097707, filed on Jun. 1, 2021.

(51) Int. Cl.
*G06F 3/06* (2006.01)

(52) U.S. Cl.
CPC .......... *G06F 3/0625* (2013.01); *G06F 3/0652* (2013.01); *G06F 3/0655* (2013.01); *G06F 3/0679* (2013.01)

(58) Field of Classification Search
CPC ........ G06F 1/3275; G06F 1/3225; G06F 1/26; G06F 1/28; G06F 1/3212; G06F 1/3268;
(Continued)

(56) References Cited

U.S. PATENT DOCUMENTS

2007/0198806 A1  8/2007 Schultz
2009/0006689 A1*  1/2009 Lubbers ................ G06F 3/0683
 710/112
(Continued)

FOREIGN PATENT DOCUMENTS

CN  102347078 A  2/2012
CN  105190764 A  12/2015
(Continued)

OTHER PUBLICATIONS

Wikipedia, "Flash memory", May 30, 2020, the Internet Archive, as preserved by the Internet Archive on May 30, 2020, pp. 1-35 web.archive.org/web/20200530002205/https://en.wikipedia.org/wiki/Flash_memory (Year: 2020).*

(Continued)

*Primary Examiner* — Curtis James Kortman
(74) *Attorney, Agent, or Firm* — BAYES PLLC

(57) ABSTRACT

In certain aspects, a memory system includes at least one memory device and a memory controller coupled to the at least one memory device. The memory controller may be configured to determine a current power consumption value indicating total concurrent power consumption of executing a plurality of memory operations in parallel. The memory controller may also be configured to determine an addon power consumption value indicating additional power consumption of executing a subsequent memory operation. The memory controller may be further configured to determine whether a summation of the current and the addon power consumption values exceeds a predetermined power consumption threshold. After determining that the summation of the current and the addon power consumption values does not exceed the predetermined power consumption threshold, the memory controller may be configured to execute the
(Continued)

subsequent memory operation in parallel with the plurality of memory operations.

20 Claims, 9 Drawing Sheets

(58) Field of Classification Search
CPC ...... G06F 1/329; G06F 3/0625; G06F 3/0653; G06F 3/0655; G06F 3/0659; G06F 3/0679; G06F 3/0673; G06F 13/1668; G11C 16/10; G11C 16/30; G11C 16/225; G11C 16/22
See application file for complete search history.

(56) References Cited

U.S. PATENT DOCUMENTS

| | | | |
|---|---|---|---|
| 2009/0300386 | A1 | 12/2009 | Archer et al. |
| 2014/0068296 | A1* | 3/2014 | Byom .................. G06F 9/5094 713/320 |
| 2016/0231957 | A1* | 8/2016 | Erez .................. G06F 3/0679 |
| 2017/0269669 | A1* | 9/2017 | Choi .................. G06F 3/0688 |
| 2018/0136851 | A1* | 5/2018 | Batra .................. G06F 3/0659 |
| 2018/0284857 | A1* | 10/2018 | Yang .................. G11C 5/04 |
| 2019/0056870 | A1* | 2/2019 | Sun .................. G06F 3/0611 |
| 2019/0065089 | A1 | 2/2019 | Myers et al. |
| 2019/0212932 | A1* | 7/2019 | Lee .................. G06F 3/0653 |
| 2019/0214087 | A1* | 7/2019 | Weinberg .................. G11C 7/1078 |
| 2020/0209944 | A1* | 7/2020 | Palmer .................. G06F 9/3836 |

FOREIGN PATENT DOCUMENTS

| | | |
|---|---|---|
| CN | 110032396 A | 7/2019 |
| CN | 112088406 A | 12/2020 |
| CN | 112582011 A | 3/2021 |
| CN | 112652333 A | 4/2021 |
| EP | 2179359 B1 | 2/2013 |
| TW | 201521326 A | 6/2015 |
| TW | 201931061 A | 8/2019 |
| TW | 201935485 A | 9/2019 |
| WO | 2016022254 A1 | 2/2016 |

OTHER PUBLICATIONS

International Search Report issued in corresponding International Application No. PCT/CN2021/097707, dated Feb. 28, 2022, 4 pages.
International Search Report issued in corresponding International Application No. PCT/CN2021/097708, mdated Feb. 24, 2022, 4 pages.
Supplementary European Search Report issued in corresponding European Application No. 21943490.9, mailed on Dec. 6, 2023, 12 pages.

* cited by examiner

POWER MANAGEMENT FOR A MEMORY SYSTEM

CROSS-REFERENCE TO RELATED APPLICATIONS

This application is a continuation of International Application No. PCT/CN2021/097707, filed on Jun. 1, 2021, entitled "POWER MANAGEMENT FOR A MEMORY SYSTEM," which is hereby incorporated by reference in its entirety. This application is also related to U.S. application Ser. No. 17/384,090, filed on Jul. 23, 2021, entitled "POWER MANAGEMENT FOR A MEMORY SYSTEM," which is hereby incorporated by reference in its entirety.

BACKGROUND

The present disclosure relates to memory systems and operation methods thereof.

Flash memory is a low-cost, high-density, non-volatile solid-state storage medium that can be electrically erased and reprogrammed. With the increase of the number of NAND flash planes and the improvement of read-write performance, peak power management is becoming more and more important in solid-state storage products, especially in UFS (Universal flash storage) chips. Existing methods of peak power control based on limiting the number of accessible NAND memory devices and limiting the total number of parallel operations are inflexible and do not fully utilize the available margins provided by power sources. Therefore, it is desirable to improve the existing power management methods to increase memory performance.

SUMMARY

In one aspect, a memory system includes at least one memory device and a memory controller coupled to the at least one memory device. The memory controller may be configured to determine a current power consumption value indicating total concurrent power consumption of executing a plurality of memory operations in parallel. The memory controller may also be configured to determine an addon power consumption value indicating additional power consumption of executing a subsequent memory operation. The memory controller may be further configured to determine whether a summation of the current and the addon power consumption values exceeds a predetermined power consumption threshold. After determining that the summation of the current and the addon power consumption values does not exceed the predetermined power consumption threshold, the memory controller may be configured to execute the subsequent memory operation in parallel with the plurality of memory operations.

In another aspect, a method for managing power of a memory system is provided. The method may include determining a current power consumption value indicating total concurrent power consumption of executing a plurality of memory operations in parallel. The method may also include determining an addon power consumption value indicating additional power consumption of executing a subsequent memory operation. The method may further include determining whether a summation of the current and the addon power consumption values exceeds a predetermined power consumption threshold. After determining that the summation of the current and the addon power consumption values does not exceed the predetermined power consumption threshold, the method may include executing the subsequent memory operation in parallel with the plurality of memory operations.

In still another aspect, a non-transitory computer-readable medium is provided. The non-transitory computer-readable medium stores instructions that, when executed by a memory controller of a memory system, cause the memory controller to perform a method of managing power of the memory system. The method may include determining a current power consumption value indicating total concurrent power consumption of executing a plurality of memory operations in parallel. The method may also include determining an addon power consumption value indicating additional power consumption of executing a subsequent memory operation. The method may further include determining whether a summation of the current and the addon power consumption values exceeds a predetermined power consumption threshold. After determining that the summation of the current and the addon power consumption values does not exceed the predetermined power consumption threshold, the method may include executing the subsequent memory operation in parallel with the plurality of memory operations.

BRIEF DESCRIPTION OF THE DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

DETAILED DESCRIPTION

Figure 1:
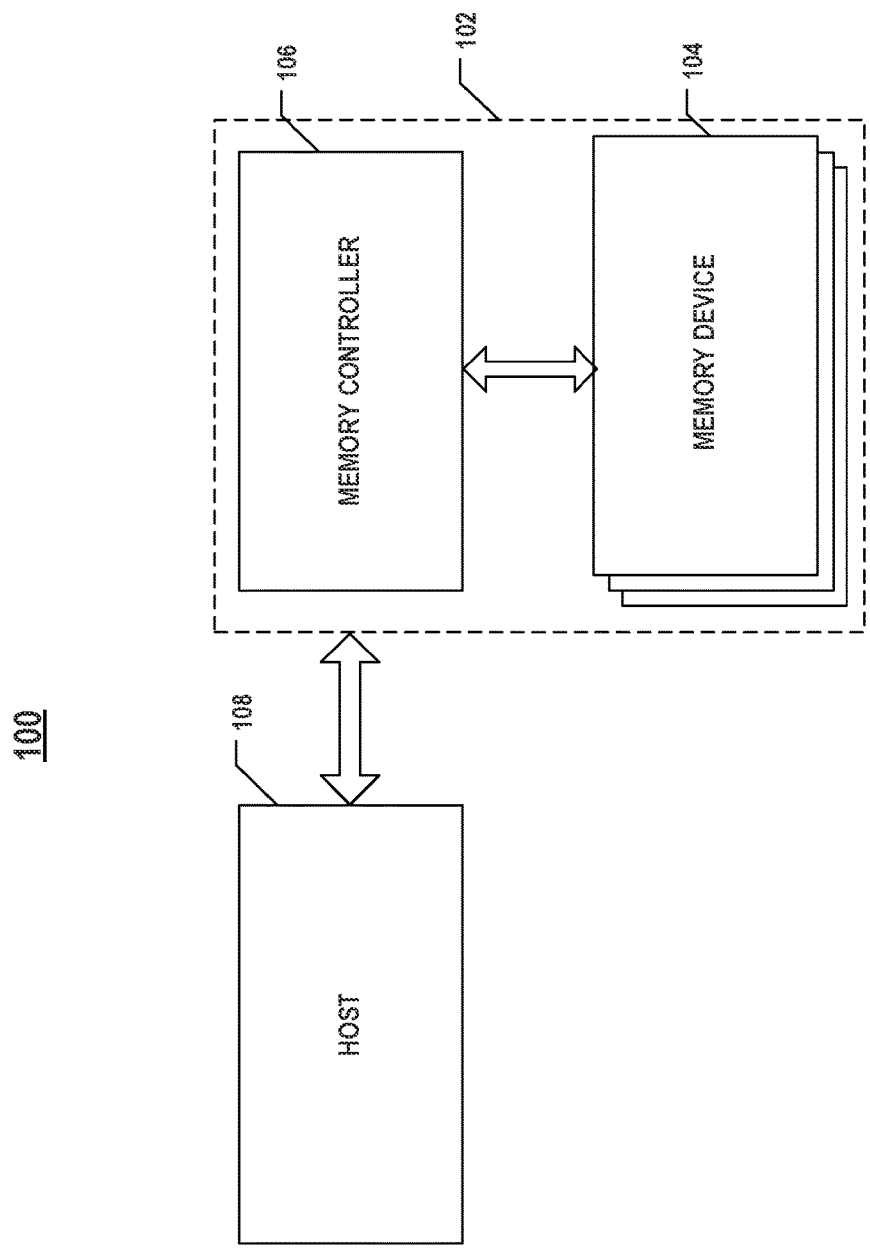
FIG. 1 illustrates a block diagram of an exemplary system having a memory system, according to some aspects of the present disclosure.

The present disclosure will be described with reference to the accompanying drawings.

Although specific configurations and arrangements are discussed, it should be understood that this is done for illustrative purposes only. As such, other configurations and arrangements can be used without departing from the scope of the present disclosure. Also, the present disclosure can also be employed in a variety of other applications. Functional and structural features as described in the present disclosures can be combined, adjusted, and modified with one another and in ways not specifically depicted in the drawings, such that these combinations, adjustments, and modifications are within the scope of the present disclosure.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

With the increase of the number of NAND flash planes and the improvement of read-write performance, peak power management is becoming more and more important in solid-state storage products. The core of peak power control is to limit the number of parallel memory operations.

A common solution is to limit the number of accessible memory devices to the upper layer. For example, managing 8 dies as 4 dies, so as to ensure that the number of parallel operations does not exceed the limit. This method, however, is inflexible because it involves the upper layer flash memory management algorithm, and it is difficult to dynamically adjust the maximum number of parallel-operating Dies. In addition, the performance is affected. For example, due to the limitation of the maximum number of parallel-operating dies for write operation, read operation performance will also be limited.

Another solution is to record the number of parallel operations based on the type of memory operation. When the number of parallel operations exceeds a threshold, no more operations will be triggered. However, this method also lacks flexibility. For example, it is difficult to cover all scenarios, e.g., when multiple Dies have different operations at the same time. Moreover, if each operation is recorded as a running Die, it may not provide full performance within the peak power range. Further, the delayed memory operations may lead to failure to utilize cache operations of the memory device.

The present application provides an improved power management solution to address one or more of the above-mentioned issues.

FIG. 1 illustrates a block diagram of an exemplary system 100 having a memory system 102, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices or systems having storage therein. As shown in FIG. 1, system 100 can include a host 108 and memory system 102 having one or more memory devices 104 and a memory controller 106. Host 108 can be a processor of an electronic device, such as a central processing unit (CPU), or a system-on-chip (SoC), such as an application processor (AP). Host 108 can be configured to send or receive data to or from memory system 102.

Memory device 104 can be any memory device disclosed in the present disclosure. For example, memory device 104 may be a NAND Flash memory device or a NOR Flash memory device. In the description below, NAND-based memory device 104 is used as an example to disclose an improved power management solution. It is noted that the disclosed power management solution can also be applied to other types of memory devices.

Memory controller 106 is coupled to memory device 104 and host 108 and is configured to control memory device 104, according to some implementations. Memory controller 106 can manage the data stored in memory device 104 and communicate with host 108. In some implementations, memory controller 106 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 106 is designed for operating in a high duty-cycle environment SSDs or embedded multi-media-cards (eMMCs) used as data storage for mobile devices, such as smartphones, tablets, laptop computers, etc., and enterprise storage arrays. Memory controller 106 can be configured to control operations of memory device 104, such as read, erase, and program operations. Memory controller 106 can also be configured to manage various functions with respect to the data stored or to be stored in memory device 104 including, but not limited to bad-block management, garbage collection, logical-to-physical address conversion, wear leveling, etc. In some implementations, memory controller 106 is further configured to process error checking and correcting (ECCs) with respect to the data read from or written to memory device 104. Any other suitable functions may be performed by memory controller 106 as well, for example, formatting memory device 104. Memory controller 106 can communicate with an external device (e.g., host 108) according to a particular communication protocol. For example, memory controller 106 may communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc. As disclosed herein, memory controller 106 may be configured to manage the power of memory system 102 to improve the operation speed of memory system 102.

Figure 2A:
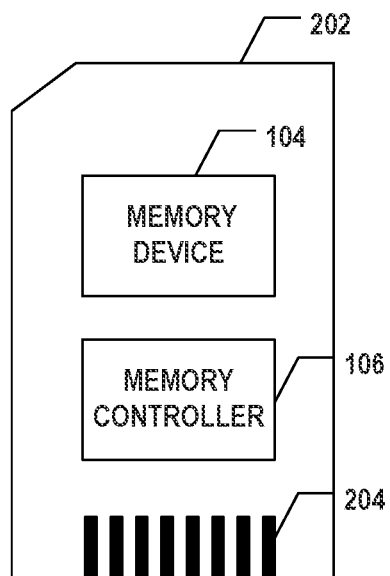
FIG. 2A illustrates a diagram of an exemplary memory card having a memory device, according to some aspects of the present disclosure.
Figure 2B:
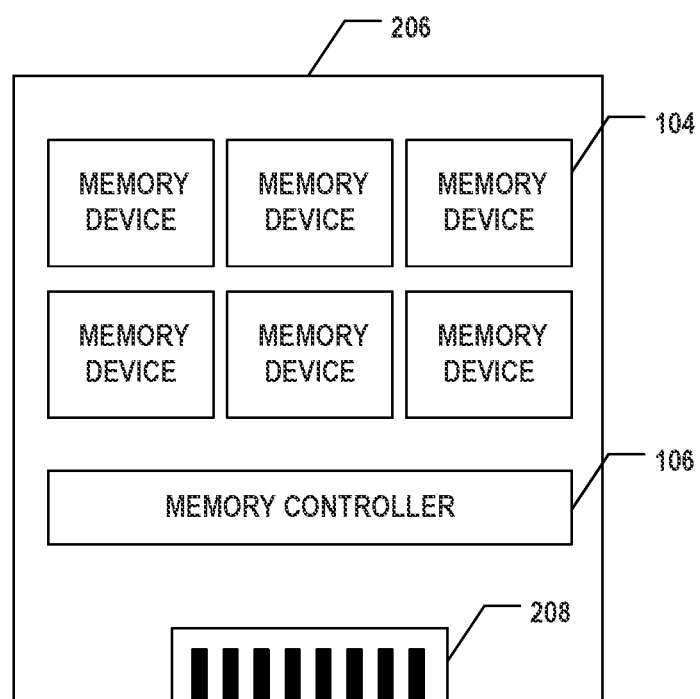
FIG. 2B illustrates a diagram of an exemplary solid-state drive (SSD) having a memory device, according to some aspects of the present disclosure.

Memory controller 106 and one or more memory devices 104 can be integrated into various types of storage devices, for example, be included in the same package, such as a universal Flash storage (UFS) package or an eMMC package. That is, memory system 102 can be implemented and packaged into different types of end electronic products. In one example as shown in FIG. 2A, memory controller 106 and a single memory device 104 may be integrated into a memory card 202. Memory card 202 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 202 can further include a memory card connector 204 coupling memory card 202 with a host (e.g., host 108 in FIG. 1). In another example as shown in FIG. 2B, memory controller 106 and multiple memory devices 104 may be integrated into an SSD 206. SSD 206 can further include an SSD connector 208 coupling SSD 206 with a host (e.g., host 108 in FIG. 1). In some implementations, the storage capacity and/or the operation speed of SSD 206 is greater than those of memory card 202.

Figure 3:
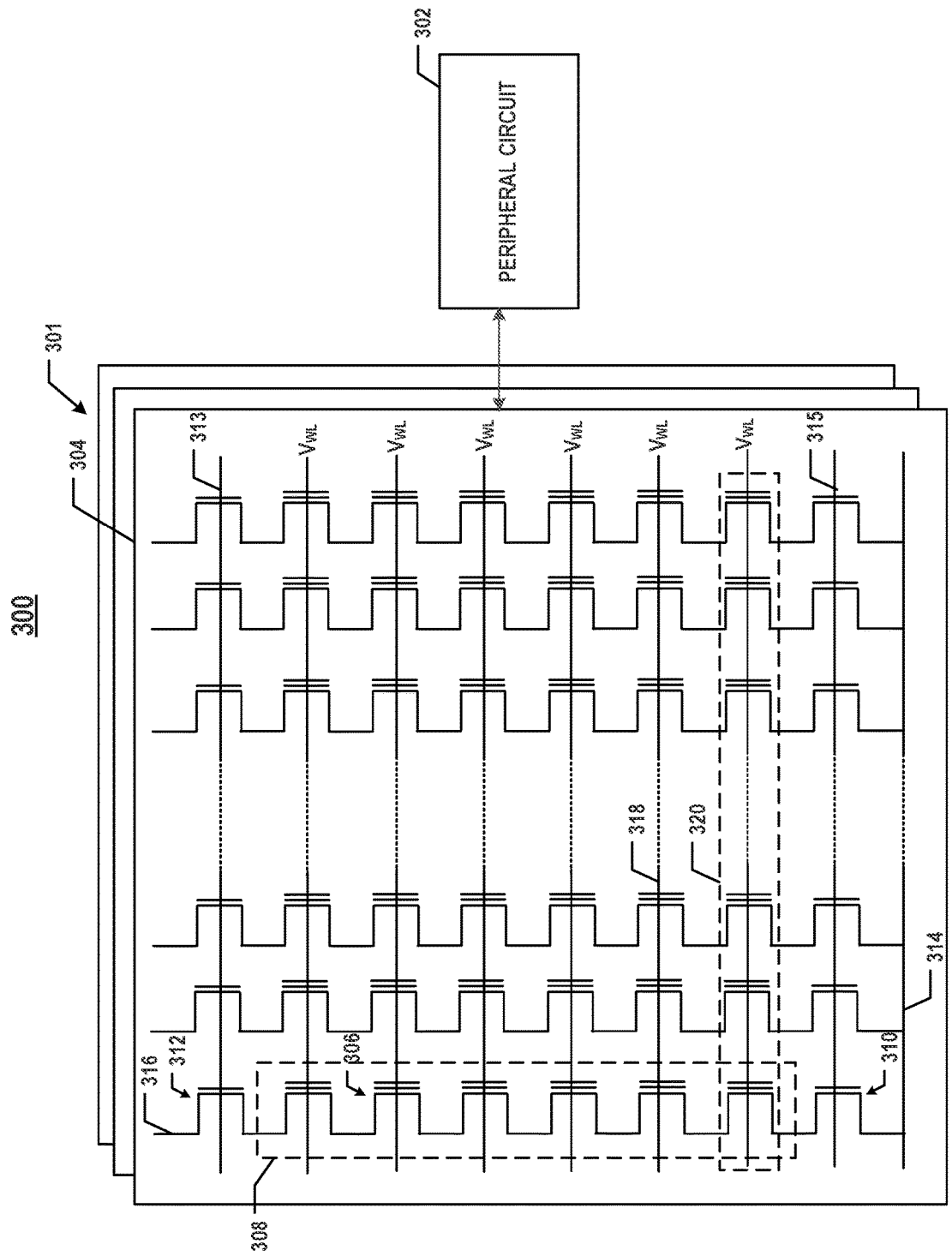
FIG. 3 illustrates a schematic diagram of an exemplary memory device including peripheral circuits, according to some aspects of the present disclosure.

FIG. 3 illustrates a schematic circuit diagram of an exemplary memory device 300 including peripheral circuits, according to some aspects of the present disclosure. Memory device 300 can be an example of memory device 104 in FIG. 1. Memory device 300 can include a memory cell array 301 and peripheral circuits 302 coupled to memory cell array 301. Memory cell array 301 can be a NAND Flash memory cell array in which memory cells 306 are provided in the form of an array of NAND memory strings 308 each extending vertically above a substrate (not shown). In some implementations, each NAND memory string 308 includes a plurality of memory cells 306 coupled in series and stacked vertically. Each memory cell 306 can hold a continuous, analog value, such as an electrical voltage or charge, that depends on the number of electrons trapped within a region of memory cell 306. Each memory cell 306 can be either a floating gate type of memory cell including a floating-gate transistor or a charge trap type of memory cell including a charge-trap transistor.

In some implementations, each memory cell 306 is a single-level cell (SLC) that has two possible memory states and thus, can store one bit of data. For example, the first memory state "0" can correspond to a first range of voltages, and the second memory state "1" can correspond to a second range of voltages. In some implementations, each memory cell 306 is a multi-level cell (MLC) that is capable of storing more than a single bit of data in more than four memory states. For example, the MLC can store two bits per cell, three bits per cell (also known as triple-level cell (TLC)), or four bits per cell (also known as a quad-level cell (QLC)). Each MLC can be programmed to assume a range of possible nominal storage values. In one example, if each MLC stores two bits of data, then the MLC can be programmed to assume one of three possible programming levels from an erased state by writing one of three possible nominal storage values to the cell. A fourth nominal storage value can be used for the erased state.

As shown in FIG. 3, each NAND memory string 308 can include a source select gate (SSG) transistor 310 at its source end and a drain select gate (DSG) transistor 312 at its drain end. SSG transistor 310 and DSG transistor 312 can be configured to activate selected NAND memory strings 308 (columns of the array) during read and program operations. In some implementations, SSG transistors 310 of NAND memory strings 308 in the same block 304 are coupled through a same source line (SL) 314, e.g., a common SL, for example, to the ground. DSG transistor 312 of each NAND memory string 308 is coupled to a respective bit line 316 from which data can be read or written via an output bus (not shown), according to some implementations. In some implementations, each NAND memory string 308 is configured to be selected or deselected by applying a select voltage (e.g., above the threshold voltage of DSG transistor 312) or a deselect voltage (e.g., 0 V) to the gate of respective transistor DSG 312 through one or more DSG lines 313 and/or by applying a select voltage (e.g., above the threshold voltage of SSG transistor 310) or a deselect voltage (e.g., 0 V) to the gate of respective SSG transistor 310 through one or more SSG lines 315.

As shown in FIG. 3, NAND memory strings 308 can be organized into multiple blocks 304, each of which can have a common source line 314. In some implementations, each block 304 is the basic data unit for erase operations, i.e., all memory cells 306 on the same block 304 are erased at the same time. Memory cells 306 of adjacent NAND memory strings 308 can be coupled through word lines 318 that select which row of memory cells 306 is affected by read and program operations. In some implementations, each word line 318 is coupled to a page 320 of memory cells 306, which is the basic data unit for program operations. The size of one page 320 in bits can relate to the number of NAND memory strings 308 coupled by word line 318 in one block 304. Each word line 318 can include a plurality of control gates (gate electrodes) at each memory cell 306 in respective page 320 and a gate line coupling the control gates.

Figure 4:
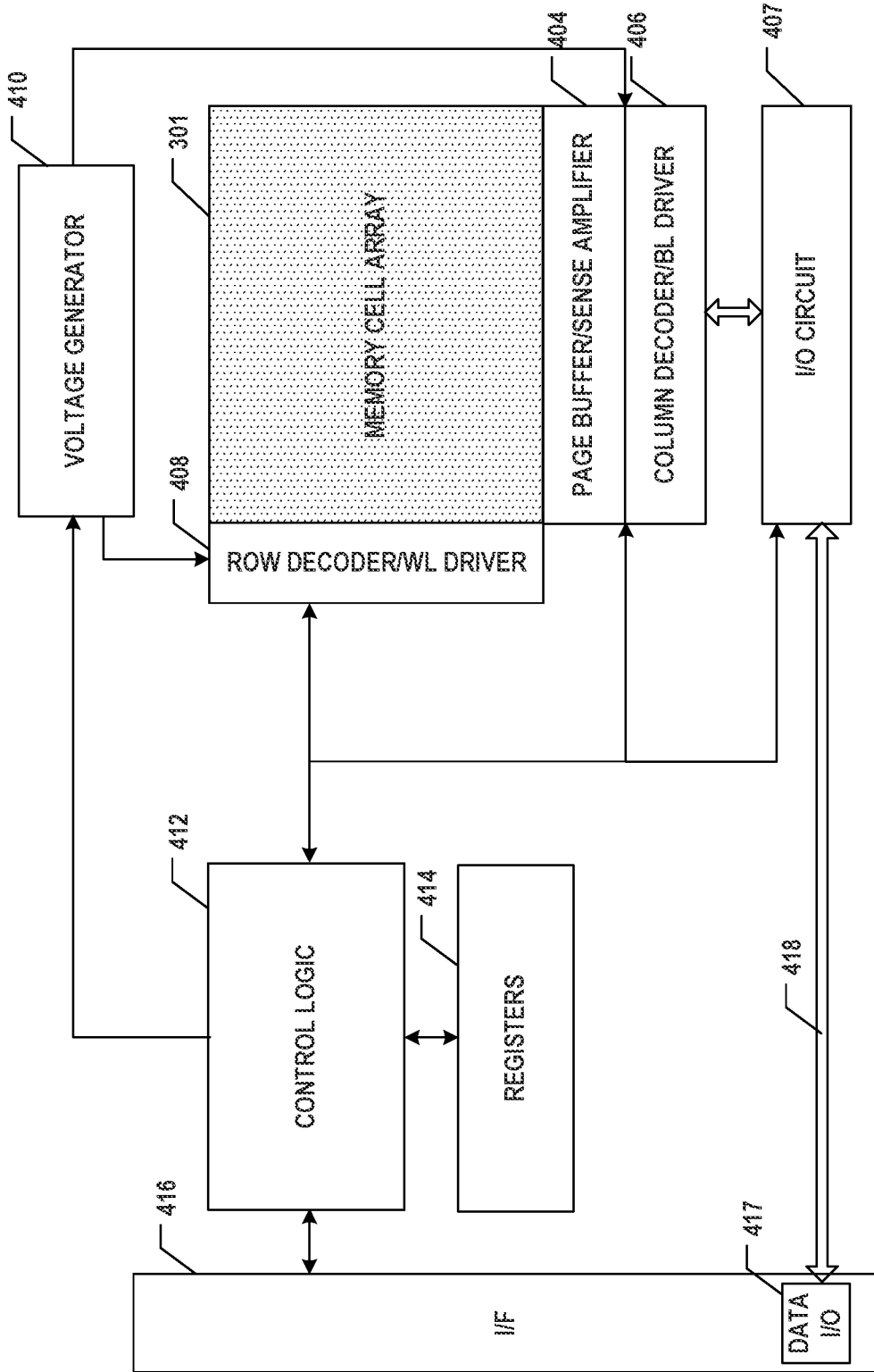
FIG. 4 illustrates a block diagram of an exemplary memory device including a memory cell array and peripheral circuits, according to some aspects of the present disclosure.

Peripheral circuits 302 can be coupled to memory cell array 301 through bit lines 316, word lines 318, source lines 314, SSG lines 315, and DSG lines 313. Peripheral circuits 302 can include any suitable analog, digital, and mixed-signal circuits for facilitating the operations of memory cell array 301 by applying and sensing voltage signals and/or current signals to and from each target memory cell 306 through bit lines 316, word lines 318, source lines 314, SSG lines 315, and DSG lines 313. Peripheral circuits 302 can include various types of peripheral circuits formed using metal-oxide-semiconductor (MOS) technologies. For example, FIG. 4 illustrates some exemplary peripheral circuits 302 including a page buffer/sense amplifier 404, a column decoder/bit line driver 406, an input/output (I/O) circuit 407, a row decoder/word line driver 408, a voltage generator 410, control logic 412, registers 414, an interface 416, and a data bus 418. It is understood that in some examples, additional peripheral circuits not shown in FIG. 4 may be included as well.

Page buffer/sense amplifier 404 can be configured to read and program (write) data from and to memory cell array 301 according to the control signals from control logic 412. In one example, page buffer/sense amplifier 404 may store one page of program data (write data) to be programmed into one page 320 of memory cell array 301. In another example, page buffer/sense amplifier 404 may perform program verify operations to ensure that the data has been properly programmed into memory cells 306 coupled to selected word lines 318. In still another example, page buffer/sense amplifier 404 may also sense the low power signals from bit line 316 that represents a data bit stored in memory cell 306 and amplify the small voltage swing to recognizable logic levels in read operation.

Column decoder/bit line driver 406 can be configured to be controlled by control logic 412 and select one or more NAND memory strings 308 by applying bit line voltages generated from voltage generator 410. I/O circuit 407 can be coupled to page buffer/sense amplifier 404 and/or column decoder/bit line driver 406 and configured to direct (route) the data input from data bus 418 to the desired memory cell areas (e.g., banks) of memory cell array 301, as well as the data output from the desired memory cell areas to data bus 418.

Row decoder/word line driver 408 can be configured to be controlled by control logic 412 and select block 304 of memory cell array 301 and a word line 318 of selected block 304. Row decoder/word line driver 408 can be further configured to drive the selected word line 318 using a word line voltage generated from voltage generator 410. Voltage generator 410 can be configured to be controlled by control logic 412 and generate the word line voltages (e.g., read voltage, program voltage, pass voltage, local voltage, and verification voltage) to be supplied to memory cell array 301.

Control logic 412 can be coupled to each peripheral circuit described above and configured to control the operations of each peripheral circuit. Registers 414 can be coupled to control logic 412 and include status registers, command registers, and address registers for storing status information, command operation codes (OP codes), and command addresses for controlling the operations of each peripheral circuit. Interface 416 can be coupled to control logic 412 and act as a control buffer to buffer and relay control commands received from a host (not shown) to control logic 412 and status information received from control logic 412 to the host. Interface 416 can also be coupled to I/O circuit 407 via data bus 418 and act as a data I/O interface and a data buffer to buffer and relay the write data received from a host (not shown) to I/O circuit 407 and the read data from I/O circuit 407 to the host. For example, interface 416 may include a data I/O 417 coupled to data bus 418.

Figure 5A:
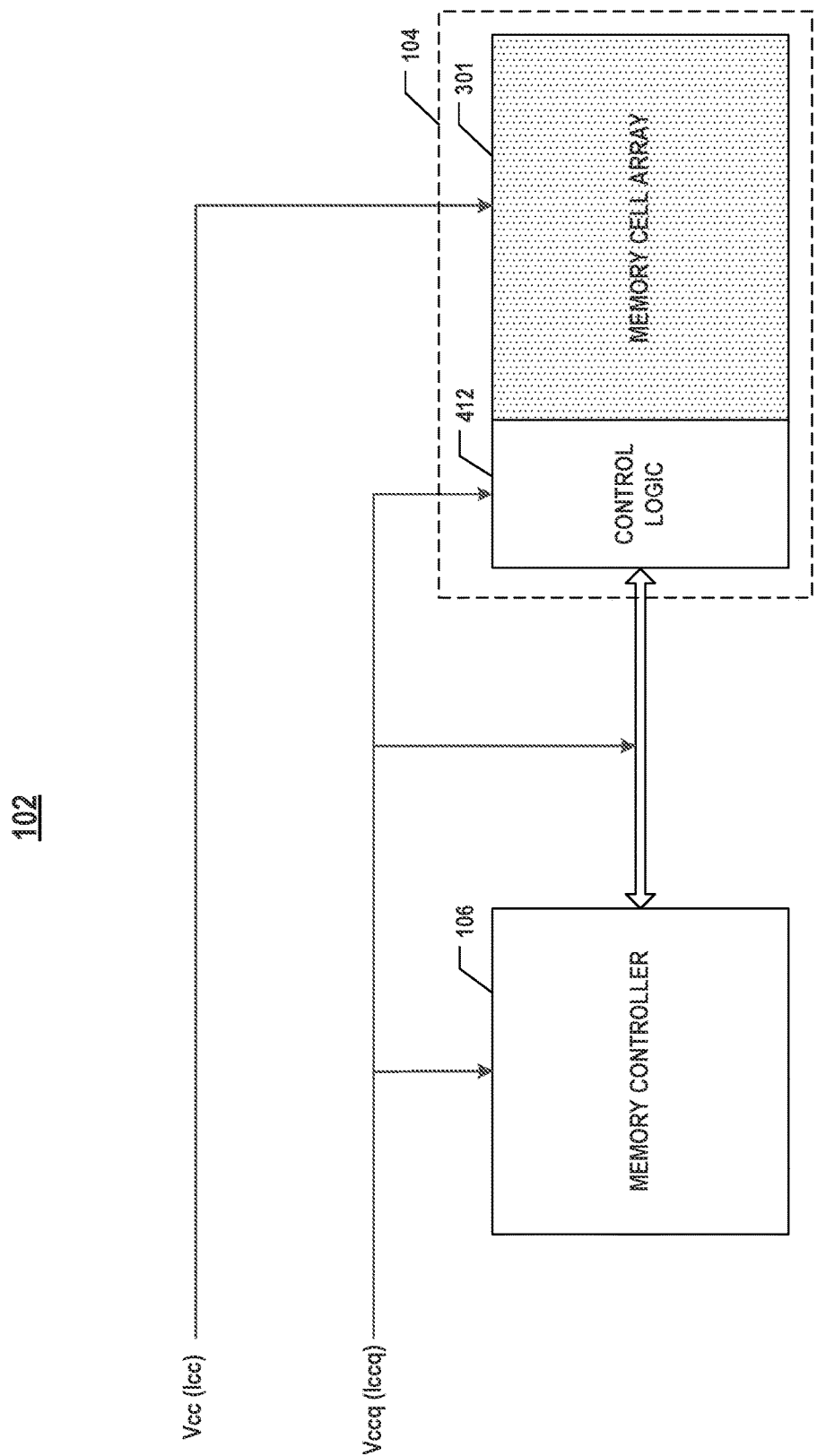
FIG. 5A illustrates an exemplary implementation of a memory system, according to some aspects of the present disclosure.

FIG. 5A illustrates an exemplary implementation of memory system 102, according to implementations of the disclosure. As shown in FIG. 5A, memory system 102 may include at least one memory device 104 (e.g., a three-dimensional (3D) NAND memory device) and memory controller 106 that is coupled to memory device 104. While only one memory device 104 is depicted in FIG. 5A for simplicity, multiple memory devices may be used. In some implementations, a memory device (e.g., 104) may also be referred to as a "die." Memory device 104 may include an array of memory cells 301 (also referred to as memory cell array 301) and control logic 412 coupled to memory cell array 301, as described above in connection with FIG. 4. Memory controller 106 and control logic 412 may be configured to facilitate information transfer between each other. In addition, control logic 412 may be configured to control memory cell array 301 to facilitate data operations with respect to memory cell array 301. For example, a data programing (writing) operation may be implemented as follows: memory controller 106 may transfer data to be programmed to control logic 412, which in turn may execute a program operation to program/write the data to memory cell array 301. In another example, a data reading operation may be implemented as follows: control logic 412 may execute a read operation to retrieve data from memory cell array 301, and then transfer the retrieved data to memory controller 106.

Memory controller 106 and control logic 412 can be implemented by microprocessors, microcontrollers (a.k.a. microcontroller units (MCUs)), digital signal processors (DSPs), application-specific integrated circuits (ASICs), field-programmable gate arrays (FPGAs), programmable logic devices (PLDs), state machines, gated logic, discrete hardware circuits, and other suitable hardware, firmware, and/or software configured to perform the various functions described below in detail. In some implementations, one or more of the functionalities of control logic 412 described above can be implemented with content-addressable memory (CAM).

As shown in FIG. 5A, memory cell array 301 may be powered by a power source Vcc, which supplies an electrical current Icc to facilitate memory operations performed by memory cell array 301, such as read operations, program operations, erase operations, etc. On the other hand, control logic 412, memory controller 106, as well as components therebetween (e.g., data bus, direct memory access (DMA) devices, etc.) are powered by another power source Vccq, which supplied an electrical current Iccq to facilitate memory operations relating to information transfer between memory controller 106 and control logic 412, such as information transfer operations including data transfer operations and instruction transfer operations. Exemplary information transfer operations include DMA read operations and DMA program (write) operations. Each of the power sources Vcc and Vccq may have a predetermined power consumption threshold, exceeding which may cause a significant drop of the corresponding electrical current (Icc or Iccq), which in turn may cause malfunction of the corresponding component(s) receiving the electrical current. For example, when memory operations performed by memory cell array 301 require a power consumption level exceeding the power consumption threshold of power source Vcc, execution of the memory operations in parallel may cause power source Vcc to overload, which in turn may cause malfunction of memory cell array 301. In another example, when memory operations relating to information transfer between memory controller 106 and control logic 412 require a power consumption level exceeding the power consumption threshold of power source Vccq, execution of the memory operations in parallel may cause power source Vccq to overload, which in turn may cause malfunction of memory controller 106 and/or control logic 412.

Figure 5B:
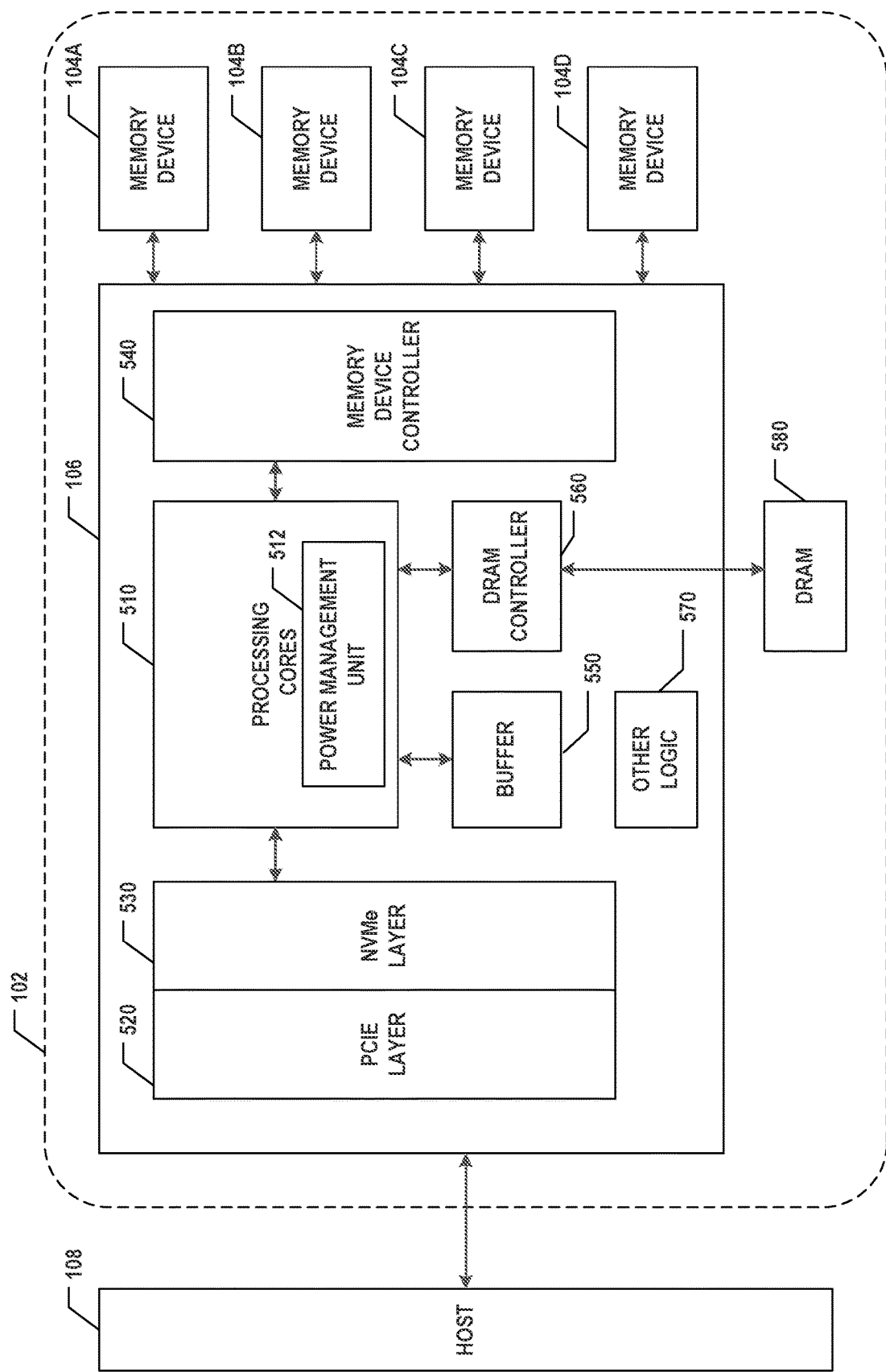
FIG. 5B illustrates another exemplary implementation of a memory system, according to some aspects of the present disclosure.

FIG. 5B illustrates another exemplary implementation of memory system 102, according to implementations of the disclosure. As shown in FIG. 5B, memory controller 106 may be coupled to a plurality of memory devices (104A-104D) and configured to control memory devices 104A-104D. While four memory devices are depicted in FIG. 5B, less or more memory devices may be used. Memory controller 106 may include a PCIE layer 520 and/or an NVMe layer 530 to interface with host 108 (e.g., a PCIE host). PCIE layer 520 and/or NVMe layer 530 may be coupled to processing cores 510, which may be configured to implement various memory control functionalities through executing instructions stored in firmware of processing cores 510. For example, a power management unit 512 may be implemented through a firmware program stored in the firmware of processing cores 510. Exemplary implementations of power management unit 512 will be discussed in greater detail in connection with FIG. 6. Processing cores 510 may be coupled to a memory device controller 540, a buffer 550, and a DRAM controller 560. Memory device controller 540 may be configured to act as an interface with memory devices 104A-104D. DRAM controller 560 may be configured to access information store on a DRAM 580. Buffer 550 may be configured to store temporary information. One or more other logics 570 may also be present in memory controller 106.

Figure 6:
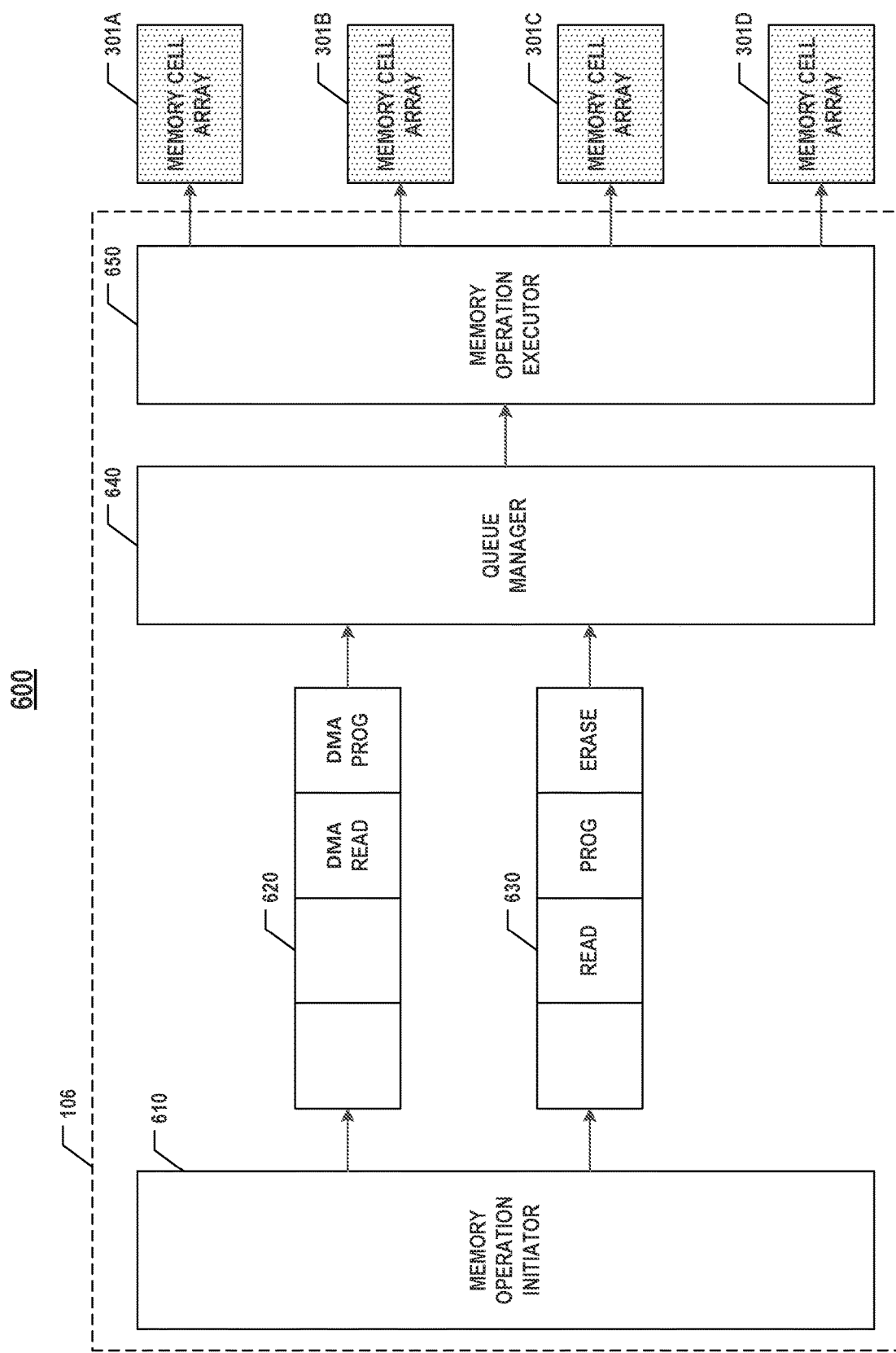
FIG. 6 illustrates an exemplary memory system with an improved power management mechanism to prevent power source overload, according to some aspects of the present disclosure.

FIG. 6 illustrates an exemplary memory system 600 with an improved power management mechanism to prevent power source overload. As shown in FIG. 6, memory system 600 may include a memory operation initiator 610, a first queue of memory operations 620, a second queue of memory operations 630, a queue manager 640, a memory operation executor 650, and a plurality of memory cell arrays 301A-301D. While four memory cell arrays are depicted in FIG. 6 for illustration purposes, less or more memory cell arrays may be used. In some implementations, memory operation initiator 610, queues 620 and 630, queue manager 640, and memory operation executor 650 may be implemented by memory device controller 540. For example, memory controller 106 may execute instructions stored on a non-transitory computer-readable medium to implement the functions of memory operation initiator 610, queues 620 and 630, and queue manager 640, and memory device controller 540 may execute instructions stored on a non-transitory computer-readable medium to implement the functions of memory operation executor 650. In some implementations, the non-transitory computer-readable medium may be in the form of a ROM device, and the instructions may be in the form of firmware. Each of the memory cell arrays 301A-301D may include an integrated control logic (not shown in FIG. 6), similar to the control logic 412 shown in FIG. 5A.

Memory operation initiator 610 may be configured to initiate memory operations to be executed, including one or more types of memory operations such as a read operation, a program operation, an erase operation, a multi-plane operation, a single-plane operation, an information transfer operation, an encoding operation, and a decoding operation. A read operation refers to an operation performed by a memory cell array to read data stored therein. A program operation refers to an operation performed by a memory cell array to program (write) data thereto. An erase operation refers to an operation performed by a memory cell array to erase (remove) data stored therein. A single-plane operation refers to an operation performed by a memory cell array that involves only a single plane of a memory device, whereas a multi-plane operation refers to an operation that involves multiple planes. An information transfer operation refers to an operation performed by memory controller 106 and/or control logic 412 (e.g., shown in FIG. 5A) to transfer data and/or instructions between memory controller 106 and a memory cell array (e.g., 301A-301D). For example, information transfer operations may include a DMA read operation to transfer data from a memory cell array to memory controller 106 and a DMA program (write) operation to transfer data from memory controller 106 to a memory cell array. Encoding and decoding operations may be performed by memory controller 106 to detect and correct errors.

Execution of each type of the above-described memory operations consumes power. Depending on the component that performs a particular memory operation, the execution of different types of memory operations may consume power from different power sources. For example, memory operations such as read operations, program operations, erase operations, multi-plane operations, and single-plane operations are primarily performed by memory cell arrays, which draw electrical current Icc and consume power from power source Vcc. Icc therefore may represent the power consumption resulting from concurrently executing multiple memory operations performed by memory cell arrays. Icc may also be used to calculate a power consumption value indicating the power consumption resulting from these concurrently executed memory operations. Accordingly, the number of concurrent memory-cell-array-performed memory operations executing in parallel may be limited by the predetermined power consumption threshold of power source Vcc. In another example, memory operations such as information transfer operations, encoding operations, and decoding operations are primarily performed by memory controller 106, which draw electrical current Iccq. Similar to Icc, Iccq may represent the power consumption resulting from concurrently executing multiple memory operations performed by memory controller 106. Iccq may also be used to calculate a power consumption value indicating the power consumption resulting from these concurrently executed memory operations. Accordingly, the number of concurrent memory-controller-performed memory operations executing in parallel may be limited by the predetermined power consumption threshold of power source Vccq.

Queues 620 and 630 are configured to separate memory operations that cause power consumption from different power sources. As shown in FIG. 6, memory controller 106 may maintain queue 620 (e.g., in buffer 550 of memory controller 106) to hold a sequence of memory operations, execution of which causing power consumption from power source Vccq, and maintain queue 630 (e.g., in buffer 550 of memory controller 106) to hold another sequence of memory operations, execution of which causing power consumption from power source Vcc. For example, queue 620 may hold memory operations such as a DMA read operation, a DMA program operation, etc. As described above, the execution of such memory-controller-performed memory operations causes power consumption from power source Vccq. In another example, queue 630 may hold memory operations such as a read operation, a program operation, an erase operation, etc. As described above, the execution of such memory-cell-array-performed memory operations causes power consumption from power source Vcc.

Separating memory operations in this manner may facilitate an improved power management method in which available margins in the power sources previously underutilized can be effectively harvested. As shown in FIG. 6, memory operation executor 650 (e.g., implemented by memory device controller 540 and/or corresponding back-end modules) may be configured to execute a plurality of memory operations in parallel. For example, the plurality of memory operations may include multiple memory operations execution of which causing power consumption from power source Vcc, and the multiple memory operations can be concurrently performed by multiple memory cell arrays. In another example, the plurality of memory operations may include multiple memory operations execution of which causing power consumption from power source Vccq, and the multiple memory operations can be concurrently performed by memory controller 106 to facilitate information transfer between memory controller 106 and multiple memory cell arrays. In a further example, the plurality of memory operations may include a combination of memory operations described in the above two cases. In any case, memory controller 106 may control the total concurrent power consumption drawn from power source Vcc to be equal to or lower than the predetermine power consumption threshold of power source Vcc, and control the total concurrent power consumption drawn from power source Vccq to be equal to or lower than the predetermined power consumption threshold of power source Vccq.

In some implementations, the above-described power management method can be implemented using queue manager 640. For example, queue manager 640 may be configured to separately determine whether the execution of a subsequent memory operation in queue 620 would cause power source Vccq to be overloaded and whether execution of a subsequent memory operation in queue 630 would cause power source Vcc to be overloaded. Take queue 620 for example, queue manager 640 may determine a current power consumption value indicating total concurrent power consumption of executing, in parallel, those memory operations drawing power from the power source Vccq. In some implementations, information of such memory operations may be provided by memory operation executor 650. For example, memory operation executor 650 may maintain a list of concurrently executing memory operations that draw power from power source Vccq. Queue manager 640 may obtain the list and determine the respective types of the memory operations in the list. Each type of memory operation may correspond to a predetermined power consumption value. A power consumption value may take many forms, such as a numerical value, a digital value, an analog value, an electrical current/voltage/power level, or any other forms of information capable of indicating the power consumption resulting from concurrent execution of memory operations. For example, in some embodiments, different levels of power consumption may be classified into multiple groups, and each group is represented by a digital code. In this case, the digital codes can be used as the power consumption values. The predetermined power consumption value may be predetermined based on the measurement of Vccq/Iccq while executing the corresponding memory operation. The predetermined power consumption value may be in the form of an absolute value (e.g., in Watt) or a relative value. In the case of taking the form of a relative value, the relative value may be calculated based on a predetermined reference, such as normalizing against the predetermined power threshold of power source Vccq, or in the form of a weight, a percentage, etc. The predetermined power consumption threshold may also be in the same form as the predetermined power consumption value. Queue manager 640 may maintain a look-up table (e.g., stored in a RAM of memory controller 106 and/or in DRAM 580) containing a mapping relationship between the types of the memory operations and the corresponding power consumption values. In this way, queue manager 640 may determine individual power consumption values corresponding to the memory operations in the list based on the respective types, for example, by mapping the respective types of memory operations to the corresponding predetermined power consumption values. After individual power consumption values are determined, queue manager 640 may determine the current power consumption value by summing up all of the individual power consumption values.

In some implementations, instead of maintaining a list of concurrently executing memory operations, memory operation executor 650 and/or queue manager 640 may maintain the current power consumption value corresponding to queue 620. After completion of a memory operation, its corresponding power consumption value can be deducted from the current power consumption value. On the other hand, after a subsequent memory operation is added to the parallel execution, its corresponding power consumption value can be added to the current power consumption value.

To prevent the current power consumption value from exceeding the predetermined power consumption threshold of power source Vccq, queue manager 640 may control the releasing or withholding of a subsequent memory operation in queue 620. For example, as shown in FIG. 6, a DMA program operation is the next (subsequent) memory operation in queue 620 to be executed in parallel with currently executing memory operations. Queue manager 640 may determine the current power consumption value, as described above, as well as an addon power consumption value indicating additional power consumption of executing the DMA program operation. Queue manager 640 may then determine whether a summation of the current and the addon power consumption values exceeds the predetermined power consumption threshold of power source Vccq:

$$P\text{sum} + Pn <= P\text{max} \qquad \text{Condition (1)},$$

where Psum refers to the current power consumption value, Pn refers to the addon power consumption value, and Pmax refers to the predetermined power consumption threshold.

If condition (1) is met, meaning adding the DMA program operation to the pool of concurrently executing memory operations would not cause power source Vccq to be overloaded, then queue manager 640 may release the DMA program operation to memory operation executor to execute in parallel with the memory operations currently in the pool. Otherwise, queue manager 640 may delay the execution of the DMA program operation by withholding it in queue 620 until an additional power consumption margin is available (e.g., completion of one or more memory operations).

In some implementations, queue manager 640 may adjust the individual power consumption values based on environmental conditions, such as temperature, to more accurately reflect the actual power consumption under different conditions. The current power consumption value may then be determined based on the adjusted individual power consumption values.

While the above example is described in connection with queue 620, power management in connection with queue 630 can be implemented in a similar manner.

The power management method disclosed herein can improve the overall speed of memory operations by utilizing margins provided by the power sources. For example, a data reading operation often requires two memory operations: a read operation and a DMA read operation, adding to queues 630 and 620, respectively. The DMA read operation is often the performance bottleneck as the execution of the DMA read imposes a heavier burden to power source Vccq than the burden to the power source Vcc imposed by execution of the read operation. Therefore, the read operation in queue 630 may finish earlier than the DMA read operation in queue 620. Instead of waiting for the completion of the DMA read operation in idle, queue manager 640 may advance queue 630 to execute the next memory operation in the queue. In this way, the next memory operation in queue 630 can be executed concurrently with the DMA read operation, effectively harvesting the available margin of power source Vcc.

In another example, a data programing (writing) operation is conventionally implemented by executing a writing operation immediately after a DMA write operation. During the time of executing the writing operation, no subsequent information transfer operations are performed. As a result, the available margin provided by power source Vccq is wasted. Using the separate queues disclosed herein, a data programming operation can be implemented using two memory operations, similar to the data reading operation. For example, the data writing operation can be implemented using a DMA program operation and a program operation adding to queues 620 and 630, respectively. Different from the data reading case, here, execution of the program operation may impose a heavier burden to power source Vcc than the burden imposed to power source Vccq by execution of the DMA program operation. Therefore, the DMA program operation may finish earlier, opening up an available margin to power source Vccq while the program operation is still executing. Instead of waiting for the completion of the program operation in idle, queue manager 640 may advance to the next memory operation in the queue, for example, another DMA program operation. This subsequent DMA program operation can then be executed in parallel with the program operation still in execution, effectively increasing the information transfer rate from memory controller 106 to the memory cell arrays.

Figure 7:
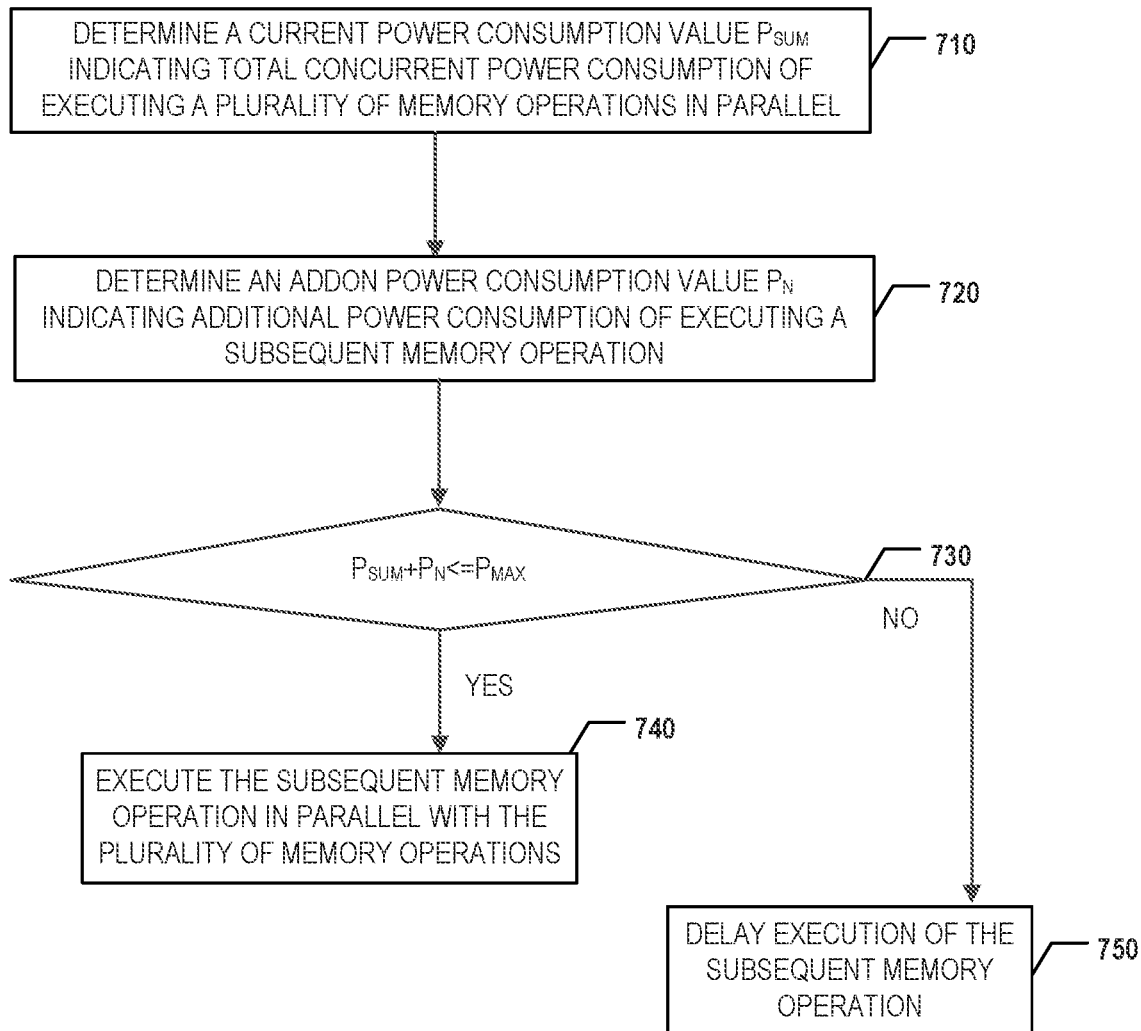
FIG. 7 illustrates a flowchart of an exemplary method for managing power of a memory system, according to some aspects of the present disclosure.

FIG. 7 illustrates a flowchart of an exemplary method 700 for managing the power of a memory system, according to some aspects of the present disclosure. The memory system may be any suitable memory system disclosed herein. Method 700 may be implemented by memory controller 106. It is understood that the operations shown in method 700 may not be exhaustive and that other operations can be performed as well before, after, or between any of the illustrated operations. Further, some of the operations may be performed simultaneously, or in a different order than shown in FIG. 7.

Referring to FIG. 7, method 700 starts at operation 710, in which memory controller 106 may determine a current power consumption value Psum indicating total concurrent consumption of executing a plurality of memory operations in parallel. For example, as described above, queue manager 640 may obtain a list of the memory operations currently from memory operation executor 650. Queue manager 640 may then determine the respective types of the memory operations, and determine individual power consumption values based on the respective types by, for example, maintaining a look-up table storing mapping relationship between the types of the memory operations and their corresponding power consumption values. Queue manager 640 may then determine the current power consumption value by summing up all of the individual power consumption values.

At operation 720, memory controller 106 may determine an addon power consumption value Pn indicating additional power consumption of executing a subsequent memory operation. For example, queue manager 640 may determine the power consumption value of a subsequent memory operation (e.g., DMA program) in queue 630 based on the type of the memory operation, similar to determining the individual power consumption values of the concurrently executing memory operations at step 710.

At operation 730, memory controller 106 may determine whether the summation of Psum and Pn exceeds a predetermined power consumption threshold (e.g., the predetermined power consumption threshold of power source Vccq). If the summation does not exceed the predetermined power consumption threshold, method 700 proceeds to step 740, in which memory controller 106 executes the subsequent memory operation in parallel with the plurality of memory operations. Otherwise, method 700 proceeds to step 750, in which memory controller 106 delays the execution of the subsequent memory operations.

Figure 8:
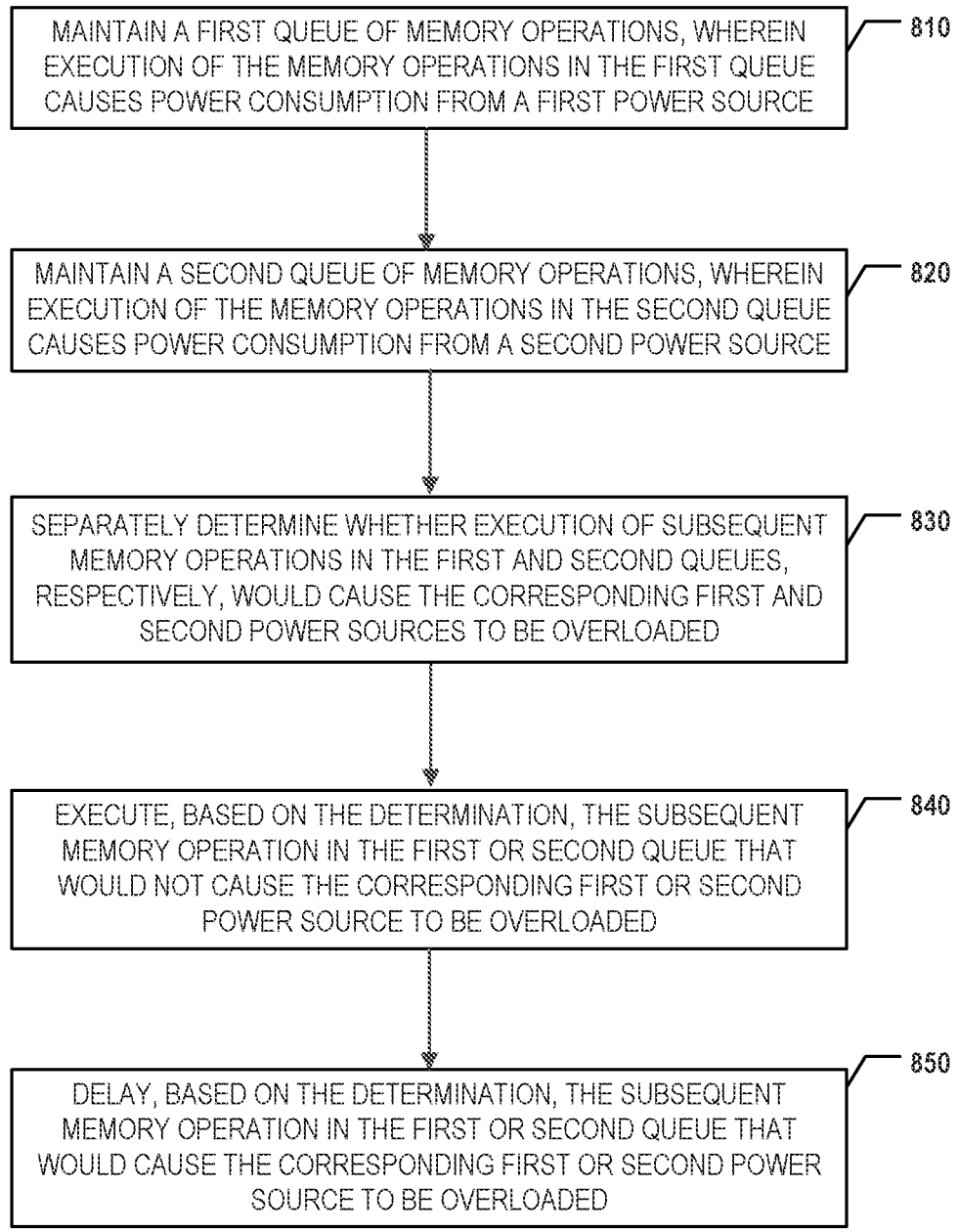
FIG. 8 illustrates a flowchart of another exemplary method for managing power of a memory system, according to some aspects of the present disclosure.

FIG. 8 illustrates a flowchart of another exemplary method 800 for managing the power of a memory system, according to some aspects of the present disclosure. The memory system may be any suitable memory system disclosed herein. Method 800 may be implemented by memory controller 106. It is understood that the operations shown in method 800 may not be exhaustive and that other operations can be performed as well before, after, or between any of the illustrated operations. Further, some of the operations may be performed simultaneously, or in a different order than shown in FIG. 8.

Referring to FIG. 8, method 800 starts at operation 810, in which memory controller 106 may maintain a first queue of memory operations (e.g., 620), wherein execution of the memory operations in the first queue causes power consumption from the first power source (e.g., power source Vccq). In operation 820, memory controller 106 may maintain a second queue of memory operations (e.g., 630), wherein execution of the memory operations in the second queue causes power consumption from the second power source (e.g., power source Vcc).

In operation 830, memory controller 106 may separately determine whether the execution of subsequent memory operations in the first and second queues, respectively, would cause the corresponding first and second power sources to be overloaded. For example, queue manager 640 may determine whether the execution of the DMA program operation in queue 620 would cause power source Vccq to be overloaded. The power source overload condition can be set similar to Condition (1) and in operation 730. For example, when Psum+Pn<=Pmax, queue manager 640 may determine that execution of the DMA program operation in queue 620 (Pn) would not cause power source Vccq to be overloaded; when Psum+Pn>Pmax, queue manager 640 may determine that execution of the DMA program operation in queue 620 (Pn) would cause power source Vccq to be overloaded. Queue manager 640 may separately determine the power source overload conditions for different queues.

At operation 840, memory controller 106 may execute, based on the determination, the subsequent memory operation in the first or second queue that would not cause the corresponding first or second power source to be overloaded. For example, queue manager 640 may release or push the DMA program operation into the pool of concurrently executing memory operations after it is determined that the power source would not be overloaded.

At operation 850, memory controller 106 may delay, based on the determination, the subsequent memory operation in the first or second queue that would cause the corresponding first or second power source to be overloaded. For example, queue manager 640 may withhold or delay releasing the DMA program operation into the pool of concurrently executing memory operations after it is determined that the power source would be overloaded.

Another aspect of the disclosure is directed to a non-transitory computer-readable medium storing instructions which, when executed, cause one or more processing units such as memory controller 106 to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be in the form of a read-only memory (ROM), and the instructions may be in the form of firmware.

According to one aspect of the present disclosure, a memory system includes at least one memory device and a memory controller coupled to the at least one memory device. The memory controller may be configured to determine a current power consumption value indicating total concurrent power consumption of executing a plurality of memory operations in parallel. The memory controller may also be configured to determine an addon power consumption value indicating additional power consumption of executing a subsequent memory operation. The memory controller may be further configured to determine whether a summation of the current and the addon power consumption values exceeds a predetermined power consumption threshold. After determining that the summation of the current and the addon power consumption values does not exceed the predetermined power consumption threshold, the memory controller may be configured to execute the subsequent memory operation in parallel with the plurality of memory operations.

In some implementations, the memory controller may be configured to delay execution of the subsequent memory operation after determining that the summation of the current and the addon power consumption values exceeds the predetermined power consumption threshold.

In some implementations, the memory controller may be configured to determine respective types of the plurality of memory operations; determine individual power consumption values corresponding to the plurality of memory operations, respectively, based on the respective types; and determine the current power consumption value based on the individual power consumption values.

In some implementations, the memory controller may be configured to adjust the determined individual power consumption values based on environmental conditions; and determine the current power consumption value based on the adjusted individual power consumption values.

In some implementations, each type of memory operation corresponds to a predetermined power consumption value. The memory controller may be configured to determine the individual power consumption values based on mapping the respective types of the plurality of memory operations to the corresponding predetermined power consumption values.

In some implementations, the types of the plurality of memory operations include at least one of a read operation, a program operation, an erase operation, a multi-plane operation, a single-plane operation, an information transfer operation, an encoding operation, or a decoding operation.

In some implementations, at least one of the current power consumption value, the addon power consumption value, or the predetermined power consumption threshold is in a form of a relative value calculated based on a predetermined reference.

In some implementations, each of the at least one memory device includes an array of memory cells and a control logic coupled to the array of memory cells. The memory controller and the control logic of the at least one memory device are powered by a first power source having a first predetermined power consumption threshold. The array of memory cells of the at least one memory device is powered by a second power source having a second predetermined power consumption threshold. The memory controller is configured to: maintain a first queue of memory operations, wherein execution of the memory operations in the first queue causes power consumption from the first power source; maintain a second queue of memory operations, wherein execution of the memory operations in the second queue causes power consumption from the second power source; separately determine whether execution of subsequent memory operations in the first and second queues, respectively, would cause the corresponding first and second power sources to be overloaded; execute, based on the determination, the subsequent memory operation in the first or second queue that would not cause the corresponding first or second power source to be overloaded; and delay, based on the determination, the subsequent memory operation in the first or second queue that would cause the corresponding first or second power source to be overloaded.

In some implementations, the memory operations in the first queue include an information transfer operation. The memory operations in the second queue include at least one of a read operation, a program operation, or an erase operation.

In some implementations, the memory device includes a three-dimensional (3D) NAND memory device.

In another aspect, a method for managing power of a memory system is provided. The method may include determining a current power consumption value indicating total concurrent power consumption of executing a plurality of memory operations in parallel. The method may also include determining an addon power consumption value indicating additional power consumption of executing a subsequent memory operation. The method may further include determining whether a summation of the current and the addon power consumption values exceeds a predetermined power consumption threshold. After determining that the summation of the current and the addon power consumption values does not exceed the predetermined power consumption threshold, the method may include executing the subsequent memory operation in parallel with the plurality of memory operations.

In some implementations, the method also includes delaying execution of the subsequent memory operation after determining that the summation of the current and the addon power consumption values exceeds the predetermined power consumption threshold.

In some implementations, the method also includes determining respective types of the plurality of memory operations; determining individual power consumption values corresponding to the plurality of memory operations, respectively, based on the respective types; and determining the current power consumption value based on the individual power consumption values.

In some implementations, the method also includes adjusting the determined individual power consumption values based on environmental conditions; and determining the current power consumption value based on the adjusted individual power consumption values.

In some implementations, each type of memory operation corresponds to a predetermined power consumption value. The method includes determining the individual power consumption values based on mapping the respective types of the plurality of memory operations to the corresponding predetermined power consumption values.

In some implementations, the types of the plurality of memory operations include at least one of a read operation, a program operation, an erase operation, a multi-plane operation, a single-plane operation, an information transfer operation, an encoding operation, or a decoding operation.

In some implementations, at least one of the current power consumption value, the addon power consumption value, or the predetermined power consumption threshold is in a form of a relative value calculated based on a predetermined reference.

In some implementations, the memory system comprises at least one memory device and a memory controller coupled to the at least one memory device. Each of the at least one memory device includes an array of memory cells and a control logic coupled to the array of memory cells. The memory controller and the control logic of the at least one memory device are powered by a first power source having a first predetermined power consumption threshold. The array of memory cells of the at least one memory device is powered by a second power source having a second predetermined power consumption threshold. The method includes maintaining a first queue of memory operations, wherein execution of the memory operations in the first queue causes power consumption from the first power source; maintaining a second queue of memory operations, wherein execution of the memory operations in the second queue causes power consumption from the second power source; separately determining whether execution of subsequent memory operations in the first and second queues, respectively, would cause the corresponding first and second power sources to be overloaded; executing, based on the determination, the subsequent memory operation in the first or second queue that would not cause the corresponding first or second power source to be overloaded; and delaying, based on the determination, the subsequent memory operation in the first or second queue that would cause the corresponding first or second power source to be overloaded.

In some implementations, the memory operations in the first queue include an information transfer operation. The memory operations in the second queue include at least one of a read operation, a program operation, or an erase operation.

In some implementations, the memory device comprises a three-dimensional (3D) NAND memory device.

In still another aspect, a non-transitory computer-readable medium is provided. The non-transitory computer-readable medium stores instructions that, when executed by a memory controller of a memory system, cause the memory controller to perform a method of managing power of the memory system. The method may include determining a current power consumption value indicating total concurrent power consumption of executing a plurality of memory operations in parallel. The method may also include determining an addon power consumption value indicating additional power consumption of executing a subsequent memory operation. The method may further include determining whether a summation of the current and the addon power consumption values exceeds a predetermined power consumption threshold. After determining that the summation of the current and the addon power consumption values does not exceed the predetermined power consumption threshold, the method may include executing the subsequent memory operation in parallel with the plurality of memory operations.

In some implementations, the method also includes delaying execution of the subsequent memory operation after determining that the summation of the current and the addon power consumption values exceeds the predetermined power consumption threshold.

In some implementations, the method also includes determining respective types of the plurality of memory operations; determining individual power consumption values corresponding to the plurality of memory operations, respectively, based on the respective types; and determining the current power consumption value based on the individual power consumption values.

In some implementations, the method also includes adjusting the determined individual power consumption values based on environmental conditions; and determining the current power consumption value based on the adjusted individual power consumption values.

In some implementations, each type of memory operation corresponds to a predetermined power consumption value. The method includes determining the individual power consumption values based on mapping the respective types of the plurality of memory operations to the corresponding predetermined power consumption values.

In some implementations, the types of the plurality of memory operations include at least one of a read operation, a program operation, an erase operation, a multi-plane operation, a single-plane operation, an information transfer operation, an encoding operation, or a decoding operation.

In some implementations, at least one of the current power consumption value, the addon power consumption value, or the predetermined power consumption threshold is in a form of a relative value calculated based on a predetermined reference.

In some implementations, the memory system comprises at least one memory device and a memory controller coupled to the at least one memory device. Each of the at least one memory device includes an array of memory cells and a control logic coupled to the array of memory cells. The memory controller and the control logic of the at least one memory device are powered by a first power source having a first predetermined power consumption threshold. The array of memory cells of the at least one memory device is powered by a second power source having a second predetermined power consumption threshold. The method includes maintaining a first queue of memory operations, wherein execution of the memory operations in the first queue causes power consumption from the first power source; maintaining a second queue of memory operations, wherein execution of the memory operations in the second queue causes power consumption from the second power source; separately determining whether execution of subsequent memory operations in the first and second queues, respectively, would cause the corresponding first and second power sources to be overloaded; executing, based on the determination, the subsequent memory operation in the first or second queue that would not cause the corresponding first or second power source to be overloaded; and delaying, based on the determination, the subsequent memory operation in the first or second queue that would cause the corresponding first or second power source to be overloaded.

In some implementations, the memory operations in the first queue include an information transfer operation. The memory operations in the second queue include at least one of a read operation, a program operation, or an erase operation.

In some implementations, the memory device comprises a three-dimensional (3D) NAND memory device.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described exemplary implementations, but should be defined only in accordance with the following claims and their equivalents.

What is claimed is:

1. A memory system, comprising:
   at least one memory device, each of which comprises an array of memory cells powered by a first power source; and
   a memory controller coupled to the at least one memory device and powered by a second power source, wherein at least a first queue and a second queue are configured to separate memory operations based on whether the memory operations cause power consumption from the first power source or the second power source, respectively, if executed, and the memory controller is configured to:
   maintain the first queue with memory operations that cause power consumption from a first one of the first and second power sources if executed;
   determine a current power consumption value of the first one of the first and second power sources indicating total concurrent power consumption of executing a plurality of memory operations in parallel;
   determine an add-on power consumption value indicating additional power consumption of executing a first subsequent memory operation in the first queue;

determine whether a summation of the current and the add-on power consumption values exceeds a first predetermined power consumption threshold associated with the first one of the first and second power sources; and responsive to determining that the summation of the current and the add-on power consumption values does not exceed the first predetermined power consumption threshold, release the first subsequent memory operation from the first queue to execute the first subsequent memory operation in parallel with the plurality of memory operations.

2. The memory system of claim 1, wherein the memory controller is further configured to:
after determining that the summation of the current and the add-on power consumption values exceeds the first predetermined power consumption threshold, delay execution of the first subsequent memory operation.

3. The memory system of claim 1, wherein the memory controller is further configured to:
determine respective types of the plurality of memory operations;
determine individual power consumption values corresponding to the plurality of memory operations, respectively, based on the respective types; and
determine the current power consumption value based on the individual power consumption values.

4. The memory system of claim 3, wherein the memory controller is further configured to:
adjust the determined individual power consumption values based on environmental conditions; and
determine the current power consumption value based on the adjusted individual power consumption values.

5. The memory system of claim 3, wherein:
each type of memory operation corresponds to a predetermined power consumption value;
the memory controller is further configured to:
determine the individual power consumption values based on mapping the respective types of the plurality of memory operations to the corresponding predetermined power consumption values.

6. The memory system of claim 3, wherein the types of the plurality of memory operations comprise at least one of a read operation, a program operation, an erase operation, a multi-plane operation, a single-plane operation, an information transfer operation, an encoding operation, or a decoding operation.

7. The memory system of claim 1, wherein at least one of the current power consumption value, the add-on power consumption value, or the first predetermined power consumption threshold is in a form of a relative value calculated based on a predetermined reference.

8. The memory system of claim 1, wherein:
each of the at least one memory device further comprises a control logic coupled to the array of memory cells;
the memory controller and the control logic of the at least one memory device are powered by the second power source; and
the memory controller is further configured to:
maintain the second queue with memory operations that cause power consumption from a second one of the first and second power sources if executed;
determine whether execution of a second subsequent memory operation in the second queue would cause the second one of the first and second power sources to be overloaded;

in response to determining that the second subsequent memory operation in the second queue would not cause the second one of the first and second power sources to be overloaded if executed, execute the second subsequent memory operation; and
in response to determining that the second subsequent memory operation in the second queue would cause the second one of the first and second power sources to be overloaded if executed, delay execution of the second subsequent memory operation.

9. The memory system of claim 8, wherein:
the memory operations in the first queue comprise an information transfer operation; and
the memory operations in the second queue comprise at least one of a read operation, a program operation, or an erase operation.

10. The memory system of claim 1, wherein the memory device comprises a three-dimensional (3D) NAND memory device.

11. A method for managing power of a memory system, wherein the memory system comprises at least one memory device, each of which comprises an array of memory cells powered by a first power source, the memory system further comprises a memory controller coupled to the at least one memory device and powered by a second power source, and the method comprises:
separating memory operations based on whether the memory operations cause power consumption from the first power source or the second power source, respectively, if executed., into at least a first queue and a second queue;
maintaining the first queue with memory operations that cause power consumption from a first one of the first and second power sources if executed;
determining a current power consumption value of the first one of the first and second power sources indicating total concurrent power consumption of executing a plurality of memory operations in parallel;
determining an add-on power consumption value indicating additional power consumption of executing a first subsequent memory operation in the first queue;
determining whether a summation of the current and the add-on power consumption values exceeds a first predetermined power consumption threshold associated with the first one of the first and second power sources; and
responsive to determining that the summation of the current and the add-on power consumption values does not exceed the first predetermined power consumption threshold, releasing the first subsequent memory operation from the first queue to execute the first subsequent memory operation in parallel with the plurality of memory operations.

12. The method of claim 11, further comprising:
after determining that the summation of the current and the add-on power consumption values exceeds the first predetermined power consumption threshold, delaying execution of the first subsequent memory operation.

13. The method of claim 11, further comprising:
determining respective types of the plurality of memory operations;
determining individual power consumption values corresponding to the plurality of memory operations, respectively, based on the respective types; and
determining the current power consumption value based on the individual power consumption values.

14. The method of claim 13, further comprising:
adjusting the determined individual power consumption values based on environmental conditions; and
determining the current power consumption value based on the adjusted individual power consumption values.

15. The method of claim 13, wherein:
each type of memory operation corresponds to a predetermined power consumption value; and
the method comprises:
determining the individual power consumption values based on mapping the respective types of the plurality of memory operations to the corresponding predetermined power consumption values.

16. The method of claim 13, wherein the types of the plurality of memory operations comprise at least one of a read operation, a program operation, an erase operation, a multi-plane operation, a single-plane operation, an information transfer operation, an encoding operation, or a decoding operation.

17. The method of claim 11, wherein at least one of the current power consumption value, the add-on power consumption value, or the first predetermined power consumption threshold is in a form of a relative value calculated based on a predetermined reference.

18. The method of claim 11, wherein:
each of the at least one memory device further comprises a control logic coupled to the array of memory cells;
the memory controller and the control logic of the at least one memory device are powered by a second one of the first and second power sources; and
the method further comprises:
maintaining the second queue with memory operations that cause power consumption from the second one of the first and second power sources if executed;
determining whether execution of a second subsequent memory operation in the second queue would cause the second one of the first and second power sources to be overloaded;
in response to determining that the second subsequent memory operation in the second queue would not cause the second one of the first and second power sources to be overloaded if executed, execute the second subsequent memory operation; and
in response to determining that the second subsequent memory operation in the second queue would cause the second one of the first and second power sources to be overloaded if executed, delay execution of the second subsequent memory operation.

19. The method of claim 18, wherein:
the memory operations in the first queue comprise an information transfer operation; and
the memory operations in the second queue comprise at least one of a read operation, a program operation, or an erase operation.

20. A non-transitory computer-readable medium storing instructions that when executed by a memory controller of a memory system cause the memory controller to perform a method of managing power of the memory system, wherein the memory system comprises at least one memory devices each of which comprises an array of memory cells powered by a first power source, the memory system further comprises a memory controller coupled to the at least one memory device and powered by a second power source, and the method comprises:
separating memory operations based on whether the memory operations cause power consumption from the first power source or the second power source, respectively, if executed, into at least a first queue and a second queue;
maintaining the first queue with memory operations that cause power consumption from a first one of the first and second power sources if executed;
determining a current power consumption value of the first one of the first and second power sources indicating total concurrent power consumption of executing a plurality of memory operations in parallel;
determining an add-on power consumption value indicating additional power consumption of executing a first subsequent memory operation in the firstqueue;
determining whether a summation of the current and the add-on power consumption values exceeds a first predetermined power consumption threshold associated with the first one of the first and second power sources; and
responsive to determining that the summation of the current and the add-on power consumption values does not exceed the first predetermined power consumption threshold, releasing the first subsequent memory operation from the first queue to execute the first subsequent memory operation in parallel with the plurality of memory operations.

* * * * *